US009819757B2

(12) United States Patent
Robinson et al.

(10) Patent No.: US 9,819,757 B2
(45) Date of Patent: Nov. 14, 2017

(54) USING PROXY DEVICES AS DYNAMIC DATA RELAYS

(71) Applicant: PRAVALA NETWORKS INC., Kitchener (CA)

(72) Inventors: Robert Robinson, Kitchener (CA); Jakub Schmidtke, Kitchener (CA)

(73) Assignee: WILMERDING COMMUNICATIONS LLC, San Antonio, TX (US)

( * ) Notice: Subject to any disclaimer, the term of this patent is extended or adjusted under 35 U.S.C. 154(b) by 254 days.

(21) Appl. No.: 14/261,795

(22) Filed: Apr. 25, 2014

(65) Prior Publication Data

US 2015/0312363 A1   Oct. 29, 2015

(51) Int. Cl.
*H04L 12/717* (2013.01)
*H04L 29/08* (2006.01)
*H04W 8/24* (2009.01)

(52) U.S. Cl.
CPC ............ *H04L 67/28* (2013.01); *H04L 67/02* (2013.01); *H04L 67/12* (2013.01); *H04L 67/2814* (2013.01); *H04W 8/24* (2013.01)

(58) Field of Classification Search
CPC ..... H04L 67/28; H04L 67/12; H04L 67/2814; H04L 67/02; H04W 8/24
See application file for complete search history.

(56) References Cited

U.S. PATENT DOCUMENTS

| | | | |
|---|---|---|---|
| 7,359,933 B1 | 4/2008 | Polen et al. | |
| 8,644,816 B2 | 2/2014 | Schmidtke et al. | |
| 8,707,389 B2 | 4/2014 | Manku | |
| 8,767,541 B2* | 7/2014 | Stamoulis | H04W 72/1278 370/230.1 |
| 2003/0208693 A1* | 11/2003 | Yoshida | H04L 29/06 726/26 |
| 2004/0033779 A1 | 2/2004 | Ochi et al. | |
| 2004/0104807 A1* | 6/2004 | Ko | G06K 9/00006 340/5.83 |
| 2004/0162871 A1* | 8/2004 | Pabla | H04W 8/005 709/201 |

(Continued)

OTHER PUBLICATIONS

International Preliminary Report on Patentability (IPRP) dated Nov. 3, 2016 for PCT application No. PCT/CA2015/050342.

*Primary Examiner* — Scott B Christensen
(74) *Attorney, Agent, or Firm* — Osha Liang LLP

(57) ABSTRACT

A local server is configured to communicate with a plurality of computing devices within a local network. The local server comprises memory for storing instructions and a processor configured to execute the instructions. The instructions cause the processor to dynamically establish a connection with one or more of the plurality of computing devices, the connection identifying the one or more of the plurality of computing devices as data relays; receive data traffic from one or more of the plurality of computing devices within the local network, the data traffic to be communicated to a destination server; transmit the data traffic to the data relays for communication to the destination server via a communication network; receive response data traffic from the data relays; and transmit the response data to the one or more of the plurality of computing devices within the local network.

26 Claims, 3 Drawing Sheets

(56) References Cited

U.S. PATENT DOCUMENTS

| | | | |
|---|---|---|---|
| 2006/0085153 A1* | 4/2006 | Oesterling | G07C 5/008 702/85 |
| 2007/0233844 A1* | 10/2007 | Tanimoto | H04L 67/1095 709/223 |
| 2009/0154706 A1* | 6/2009 | Lee | H04L 9/32 380/278 |
| 2009/0252134 A1* | 10/2009 | Schlicht | H04L 1/0015 370/338 |
| 2012/0120962 A1 | 5/2012 | Ll et al. | |
| 2013/0067572 A1* | 3/2013 | Muramoto | H04L 63/1408 726/22 |
| 2013/0080612 A1 | 3/2013 | Armstrong et al. | |
| 2013/0136128 A1* | 5/2013 | Robinson | H04L 45/74 370/392 |
| 2013/0246507 A1* | 9/2013 | Amemiya | H04L 67/2814 709/203 |

\* cited by examiner

USING PROXY DEVICES AS DYNAMIC DATA RELAYS

BACKGROUND

1. Field of the Disclosure

The present disclosure relates generally to transmitting data across a communication network and specifically to a system and method using proxy devices as dynamic data relays to facilitate the communication.

2. Discussion of the Background Art

A connected car is a vehicle that is equipped with a network access device that provides the vehicle with access to a wireless wide area network, such as the Internet. Typically, the network device is configured to access a cellular network using a telecommunication technology such as Third Generation (3G), Long Term Evolution (LTE), 3G Enhanced Voice-Data Optimized (EVDO) and the like. Additionally, the network access device may be configured to access a Wi-Fi network when available. In these situations, the Wi-Fi network may take priority over the cellular network.

The access device may also include a local area network to provide Internet access to other computing devices in the vehicle. This local area network may include both wired and wireless technologies. Therefore, computing devices such as smart phones, tablets, notebooks and other portable computing devices can access the Internet via the access device. In addition, the car is often outfitted with in-vehicle computing devices that leverage the Internet access to provide additional services to both the driver and passengers. Examples of such services include automatic notification of crashes, notification of speeding, smart navigation, audio and video media streaming, and the like.

As the services provided by the connected car become more essential, the reliability of the access device's connection to the Internet becomes more important. Accordingly, it is an object of the present embodiment to provide an improved system and method for connecting a network access device to a communication network.

SUMMARY

In accordance with an aspect of an embodiment, there is provided a local server configured to communicate with a plurality of computing devices within a local network, the local server comprising: memory for storing instructions; a processor configured to execute the instructions to: dynamically establish a connection with a predefined one or more of the plurality of computing devices, the connection identifying the one or more of the plurality of computing devices as a data relay; receive data traffic from one or more of the plurality of computing devices, the data traffic to be communicated to a destination server; transmit the data traffic to the predefined one or more of the plurality of computing devices for communication to the destination server via a communication network; receive response data traffic from the predefined one or more of the plurality of computing devices; and transmit the response date to the one or more of the plurality of computing devices.

In accordance with another aspect of an embodiment, there is provided a non-transitory computer readable medium having stored thereon instructions which, when executed by a computing device cause the computing device to: establish a connection with a local server; dynamically identify the computing device as a data relay for the local server; receive outbound data traffic from the local server; transmitting the outbound data traffic to a destination server; receiving inbound traffic from the destination server; and transmitting the inbound traffic to the local server.

In accordance with yet another aspect of an embodiment, there is provided a network comprising: a local server; and a plurality of computing devices configured to communicate with the local server; wherein the local server is configured to route data traffic between one or more of the plurality of computing devices and at least one predefined computing device, the data traffic to be communicated to a destination server; and wherein the at least one predefined computing device is configured to: receive the data traffic from local server; communicate the data traffic to the destination server via a communication network; receive response data from the destination server via the communication; and communicate the response data to the local server.

BRIEF DESCRIPTION OF THE DRAWINGS

Embodiments of the disclosure will now be described by way of example only with reference to the following drawings in which.

DETAILED DESCRIPTION OF THE PREFERRED EMBODIMENTS

Figure 1:
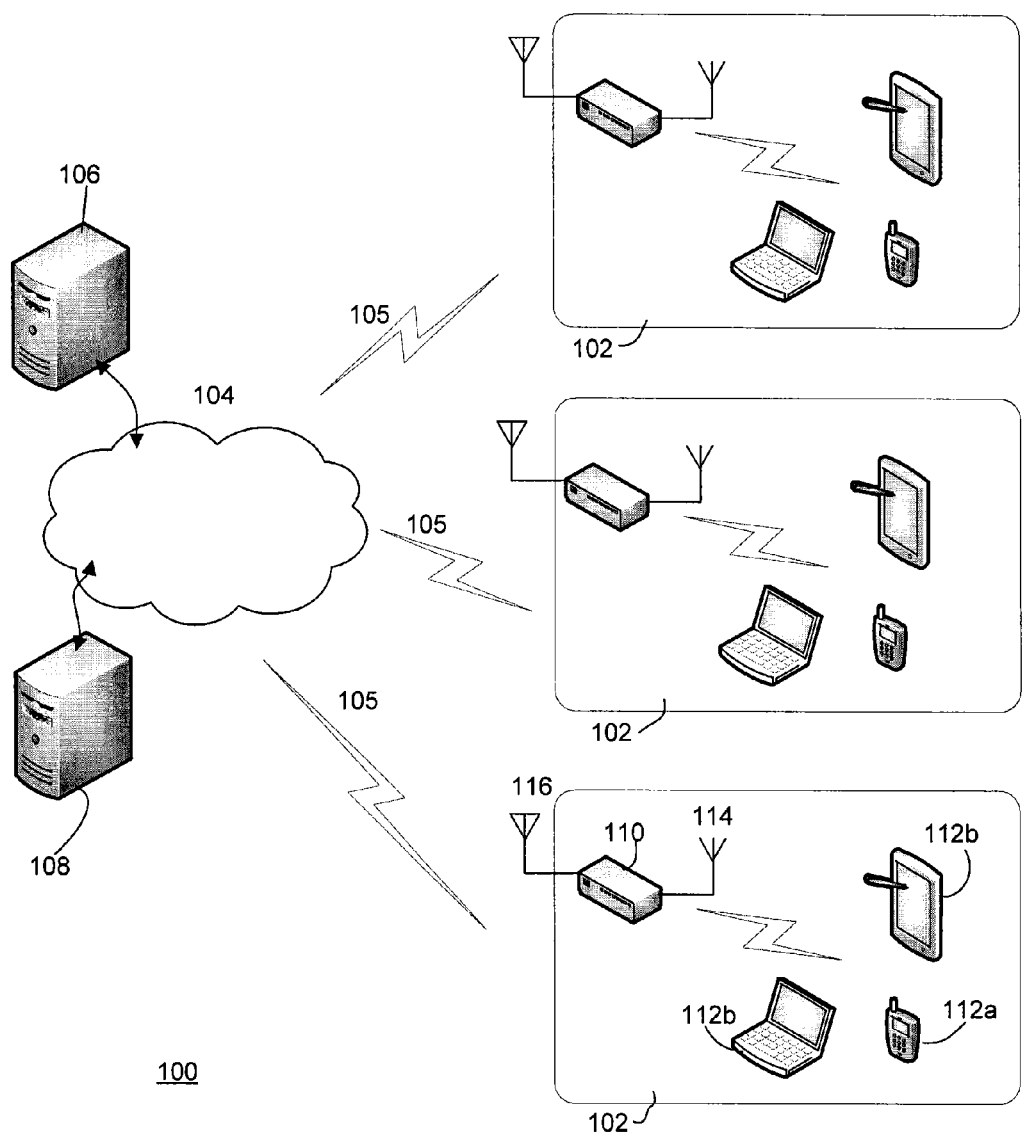
FIG. 1 is a schematic diagram illustrating a communication infrastructure.

For convenience, like numerals in the description refer to like structures in the drawings. Referring to FIG. 1, a communication infrastructure is illustrated generally by numeral 100. The communication infrastructure 100 includes a plurality of local networks 102, a communication network 104, one or more communication network links 105, an encapsulation server 106 and a destination server 108.

The communication network 104 comprises one or more of a plurality of cellular tower and access points to facilitating communication with the communication network links. The communication network 104 may also include a wide area network (WAN) and/or a local area network (LAN). This includes, for example, public networks such as the Public Switched Telephone Network (PSTN) and the Internet, as well as private networks or Intranets. The actual configuration of the communication network 104 may vary, depending on the implementation, as will be appreciated by a person of ordinary skill in the art.

Each of the local networks 102 includes a local server 110 and one or more computing devices 112. At least one of the computing devices 112 within the local network 102 is capable of communicating with the communication network 104 via one or more of the communication network links 105. For example, one of the communication network links 105 is a cellular network. The cellular network may be accessed using any of a number of known or proprietary telecommunication standards such as Third Generation (3G), Long Term Evolution (LTE), 3G Enhanced Voice-Data Optimized (EVDO) and the like. As another example, one of the communication network links 105 is a wireless area network. The wireless area network may be accessed using any of a number of known or proprietary wireless communication standards, such as Wi-Fi, WiMax and the like. As yet another example, one of the communication network links 105 is a satellite network. The satellite network may be accessed using any of a number of known or proprietary satellite communication standards.

The local server 110 includes one or more local network interfaces 114. The local network interfaces 114 facilitate communication between the computing devices 112 and the local sever 110. The local network interfaces 114 may include interfaces for wired communication and/or wireless communication. Examples of interfaces for wired communication include Ethernet, Universal Serial Bus (USB), Apple Lightning, controller area network (CAN) bus, process field bus (profibus), Modbus, and the like. Examples of interfaces for wireless communication include Wi-Fi, WiMax, Bluetooth, infrared, near field communication (NFC) and the like.

Depending on the implementation, the local server 110 may also include one or more communication network interfaces 116. The communication network interfaces 116 provide access to the communication network links 105. For example, the communication network interfaces 116 may be configured to access the communication network links 105 by one or more of cellular technology, Wi-Fi, WiMax, satellite and the like. Thus, in some embodiments, the local server 110 may not include the communication network interface 116, or includes inactive communication network interfaces 116, and relies exclusively on the computing devices 112 to access the communication network 104, as will be described. In other embodiments, the local server 110 includes active communication network interfaces 116 and relies on a combination of the communication network interfaces 116 and the computing devices 112 to access the communication network 104, as will be described.

For ease of explanation, computing devices 112 that are configured to facilitate access to the network communication links 105 are referred to as proxy devices 112a. Computing devices 112 that are not configured as proxies are referred to as client devices 112b. Client devices 112b may not be capable of direct access to the communication network 104, may not have direct access to the communication network 104 or may not share its direct access to the communication network 104 with the local server 110. The computing devices 112 can connect to the local server 110 using known or proprietary methods. For example, some of the computing devices 112 may have a permanent wired connection to the local server 110, some of the computing devices 112 may have a removable wired connection to the local server 110 and some of the computing devices 112 may have a wireless connection to the local server 110. The local server 110 may require some form of validation before establishing the connection. The validation may be in the form of a user name and password combination, personal identification number (PIN) or the like.

The proxy devices 112a are preconfigured to be able to function as a relay service for the local server 110. In this embodiment, each proxy device 112a includes a relay service application to provide this function. As is known in the art, the relay service application can be a standalone software application or it can be integrated into another application or the operating system itself of the proxy device 112a.

The local server 110 is preconfigured to be able to route data traffic to the communication network 104 via the proxy devices 112a. The local server 110 may also route data traffic to the communication network 104 directly, if it is capable of doing so. As will be appreciated, there may be many different data paths to the communication network 104 that are available to the local server 110. The local server 110 can use the different data paths for bandwidth aggregation, traffic shaping, traffic replication and the like. Segmenting data traffic for bandwidth aggregation is described in detail in U.S. Pat. No. 8,707,389 to Tajinder Manku and titled "Multi-Transport Mode Devices Having Improved Data Throughput", the description of which is incorporated herein by reference. The Mobility and Aggregation Server (MAS) described in the patent to Manku is an example of the encapsulation server 106.

Further, the local server 110 can enforce policies regarding the types of data traffic that can be provided to each of the computing devices 112 within the local network 102. In this embodiment, the local server 110 includes a routing application to provide this function. As is known in the art, the routing application can be a standalone software application or it can be integrated into another application or the operating system itself of the local server 110.

The encapsulation server 106 is configured to receive the data traffic via the plurality of different network paths, decapsulate the data traffic and forward the data traffic to the destination server 108. The encapsulation server 106 could perform additional operations, such as aggregation or deduplication of packets, to improve performance or reliability. Similarly, the encapsulation server 106 is configured to receive data traffic from the destination server 108, encapsulate the data traffic and forward the data traffic to the computing devices 112 via the plurality of different network paths. When forwarding the data traffic to the computing devices 112, the encapsulation server 106 could perform additional operations, such as packet reordering, duplication, filtering, or any other type of operation which will be appreciated by those with ordinary skill in the art to improve the performance, reliability and/or security of the data traffic. The computing devices 112, in turn, forward the data traffic to the local server 110, which decapsulates the data traffic. Another example implementation in which the encapsulation server 106 is a MAS is described in greater detail in U.S. Patent Application Publication No. 2012/0120962 by Li et al and titled "Communication between client and server using multiple networks", the description of which is incorporated herein by reference.

In this embodiment, the local server 110 encapsulates the data traffic to facilitate communication with the encapsulation server 106. The encapsulation server 106 decapsulates the packets upon receipt. Various schemes for encapsulating the data packets to facilitate transmission via a plurality of data paths is described in U.S. Pat. No. 8,644,816 by Schmidtke et al and titled "Transmitting Data Over a Plurality of Different Networks", U.S. Patent Application Publication No. 2013/0080612 by Armstrong et al. and titled "An encapsulation system featuring an intelligent network component", and U.S. Patent Application Publication No. 2013/0136128 by Robinson et al. and titled "Encapsulation Traffic While Preserving Packet Characteristics", the descriptions of which are incorporated herein by reference.

Figure 2:
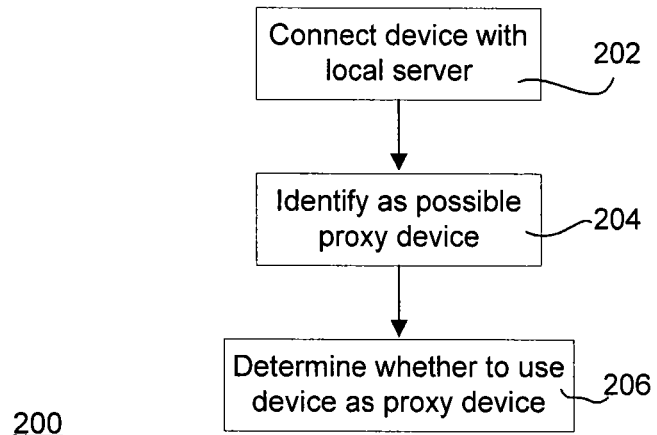
FIG. 2 is a flow chart illustrating dynamically establishing a computing device as a data relay.

Referring to FIG. 2, a flow chart illustrating dynamically establishing the proxy device 112a as a data relay is illustrated generally by numeral 200. At step 202, the proxy device 112a establishes a connection with the local server 110. For example, the connection is established using a wireless connection when the proxy device 112a is proximate to the local network 102. In another example, the connection is established using a wired connection when the proxy device 112a is within the local network 102. At step 204, the proxy device 112a identifies itself as a data relay for the local server 110. In this embodiment, the relay service application executing on the proxy device 112a communicates with the routing application executing on the local server 110 to establish the proxy device 112a as a data relay. At step 206, the local server 110 determines whether or not to use the proxy device 112a as a data relay. The decision to use the proxy devices 112a is based, at least in part, on a variety of input metrics. Example of the input metrics include configured policies, current and/or historical network characteristics of the proxy device's connection to the communication network 104, location, time of day, type of the data traffic and the like. Accordingly, it will be appreciated that the proxy devices 112a are dynamically established as data relays for the local server 110 when joining the local network 102.

Figure 3:
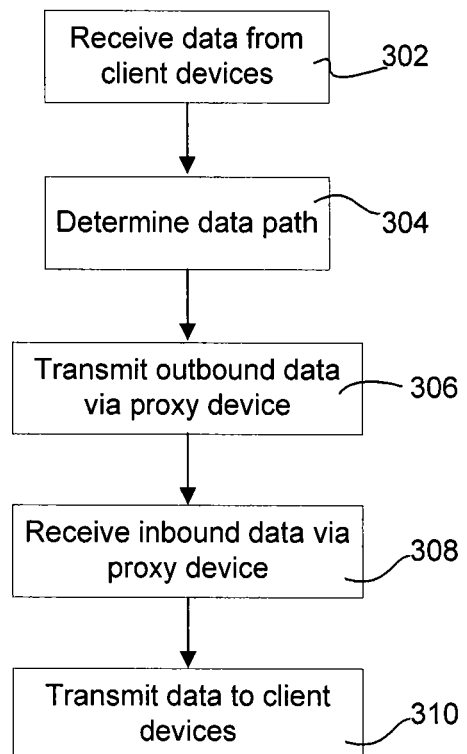
FIG. 3 is a flow chart illustrating a local server utilizing data relays.

Referring to FIG. 3, a flow chart illustrating using the proxy device 112a as a data relay is illustrated generally by numeral 300. At step 302, the local server 110 receives data traffic from one of the client devices 112b. The received data traffic is destined for one or more of the destination servers 108.

At step 304, the local server 110 determines which data path to use to communicate with the communication network 104 in order to transmit the received data traffic to the destination server 108. As previously described, the local server 110 may have multiple independent data paths, via the different network communication links 105, to the communication network 104. For example, the local server 110 can be equipped with the communication network interface 116, which provides one or more different data paths to the communication network 104. Additionally, the local server 110 can connect to the communication network 104 via the proxy devices 112a that have been established as data relays. Further, the proxy devices 112a may provide different data paths to the communication network 104. For example, the proxy devices 112a may be configured to communicate with the communication network 104 by one or more of cellular technology and Wi-Fi.

The local server 110 selects one or more of the data paths based on a number of different transmission parameters. Examples of transmission parameters include a link type, battery level, cost, signal strength, and the like. The local server 110 uses the transmission parameters to select one or more of the proxy devices 112a to satisfy an optimization parameter. Examples of optimization parameters include cost, quality, reliability, performance, and the like. The optimization parameters can be stored on the local server 110, retrieved from the computing devices 112 within the local network 102, retrieved from a remote policy and configuration server (not shown), or a combination thereof. If the optimization parameters are retrieved from a third party, such as the computing device 112 or the remote policy and configuration server, the optimization parameters may be signed for authentication using any one of a number of known or proprietary authentication algorithms. As will be appreciated, the proxy devices 112a selected by the local server 110 when optimizing transmission of the data traffic for cost may be different than those selected by the local server 110 when optimizing transmission of the data traffic for reliability. Further, the local server 110 can be configured to implement custom policies. For example, a data sharing policy can be implemented to let users choose how data is split across the proxy devices 112a in order to manage different data access plans. Specifically, the user can apply different bandwidth restrictions to different proxy devices 112a because of the different data access plans and the local server 110 routes the data traffic accordingly. In this example, the user can set a maximum bandwidth of 3 GB of data on a first smart phone, but only 500 MB of data on a second smart phone because it has a smaller or more expensive data access plan. As a result, the local server 110 routes the data traffic to the first and second smart phones at a ratio of 6:1, respectively.

At step 306, once the local server 110 has decided to use the proxy device 112a as a data relay, it begins sending selected outbound data traffic to the proxy device 112a. In this embodiment, the local server 110 encapsulates the data traffic. The local server 110 may also perform any number of optional steps to manipulate the data traffic. This manipulation may include packet reordering, duplication, filtering, or any other type of operation which will be appreciated by those with ordinary skill in the art to improve the performance, reliability and/or security of the data traffic.

The proxy 112a device, upon receiving the outbound data traffic from the local server 110, transmits the data traffic to the encapsulation server 106. The identity of the encapsulation server 106 is provided to the data relay 112a by the local server 110, either as part of an initial configuration message or in line with the data traffic. As will be appreciated, the proxy device 112a may be able to connect to the communication network 104 using a plurality of different data paths. The data path selected to connect from the proxy device 112a to the communication network 104 is determined by either the local server 110 or the proxy device 112a. The selected data path may depend on the type of traffic being sent, policy, network capabilities, and the like.

Further, the proxy device 112a may need to modify the outbound data traffic it receives from the local server 110 prior to transmitting it to the encapsulation server 106 to account for network differences. For example, the proxy device 112a may need to split a data packet if the maximum transmission unit (MTU) for the communication network link 105 is too small to accommodate the data packet. As another example, the proxy device 112a may need to rewrite the source and/or the destination Internet Protocol (IP) address of the data packet.

The proxy device 112a receives inbound data traffic from the encapsulation server 106. The proxy device 112a may need to modify the inbound data traffic prior to transmitting it to the local server 110 to account for network differences. For example, the proxy device 112a may combine data packets if the maximum transmission unit (MTU) for the communication network link 105 is sufficiently large. As another example, the proxy device 112a may need to map and rewrite the destination Internet Protocol (IP) address of the data packet to a corresponding destination IP address for the local server 110.

At step 308, the local server 110 receives the data traffic from the proxy device 112a and decapsulates it. At step 310, the local server 110 transmits the data traffic to the client devices 112b.

Thus it can be seen that the local server 110 can use the proxy devices 112a as data relays for data traffic for the computing devices within the local network 102. This configuration provides a number of benefits. It is possible for the local server 110 to perform a type of traffic shaping by only allowing certain traffic to flow when a proxy device 112a is available. For example, the local server 110 could restrict the computing devices 112 from accessing video streams when using the communication network interface 116. However, the computing devices 112 may be permitted to access video streams when one or more proxy devices 112a are available. Further, the local server 110 can also direct data traffic along specific data paths. For example, the local server 110 could transmit statistics and logging information regarding the local network using only the communication network interface 116, which may be more trusted that the proxy devices 112a. If the local server 110 determines that none of the available data paths are suitable for the data traffic, then the data traffic may be dropped.

Further, as discussed above, more than one proxy device 112a may act as data relay for the local server 110. The local server 110 is therefore able to select between the available proxy devices 112a and its own communication network interfaces 116 using policy, current and historic network characteristics, data traffic characteristics, location, and the like. Increasing the number of proxy devices 112a may also provide several possible benefits. For example, the reliability of communication may increase as a result of a diversity of network providers available. The diversity of network providers provides different network paths including different communication technologies, different network carriers within common communication technologies and different communication frequencies. Further, the network capacity may increase as a result of a diversity of telecommunication technologies and radio frequency channels available. Yet further, the cost of communication may be decreased by enabling cheaper networks to be used for the greatest amount of data traffic. Yet further, other methods of improving network connectivity in presence of multiple relays may be possible, such as bandwidth aggregation over multiple proxy devices 112a or replicating data traffic and sending the same data traffic over multiple proxy devices 112a for even greater reliability.

As previously described, it is possible for any computing device 112 connected to the local server 110 to pass data traffic over any of the local network's communication network links 105. In this scenario the local server 110 acts as a network router. For example, a client device 112b with no direct access to the communication network, such as a laptop with only a Wi-Fi card, will use the local server 110 as a network router. The local server 110 will decide whether to transmit the data traffic using one or more of the communication network interfaces 116 and the proxy devices 112a.

Yet further, it is also possible for the proxy device 112a to add a layer of intelligence and act as a proxy instead of a simple data relay. For example, the local server 110 may wish to access a service that is only available over a network to which a specific proxy device 112a is connected, such as accounting information associated with a mobile subscriber's data plan. Because the local server 110 is unable to communicate directly with the accounting server, the proxy device 112a acts on behalf of the local server 110 to request the information and returns a result to the local server 110.

Use of encrypted encapsulation between the local server 110 and the encapsulation server 106 provides a number of possible advantages. For example, encrypted encapsulation may enhance privacy since the identity of destination server 108 is obscured from view of the proxy devices 112a and other intermediary devices in the data path between the encapsulation server 106 and the local server 110. As another example, encrypted encapsulation may enhance security since the content of the data traffic is obscured from view of the proxy devices 112a and other intermediary devices in the data path between the encapsulation server 106 and the local server 110. Thus, security of the data traffic may be enhanced using a trusted encapsulation server 106, even if the proxy devices 112a are untrusted or unsecured Yet further, using multiple data paths to transmit the data traffic may increase privacy and security. Because of the diversity of network connectivity provided by the multiple data paths, the data traffic is routed across different networks, obfuscating from any one network provider the sum of all data traffic sent.

Although the embodiments described above discuss the use of encapsulation to facilitate communication, the system could also be implemented using simple IP routing instead of encapsulation. In this embodiment, the proxy device 112a and local server 110 communicate using a very simple routing protocol. This routing protocol would simply advertise the existence of the proxy device 112a as a data relay. The local server 110 would use the advertisement to modify the routing table of the operating system as required. The management of the operating system routing table would be the responsibility of the routing application, which would enable support for multiple data relays. In this embodiment, additional support from the operating system of the local server 110 may be necessary to enable traffic to flow over multiple data relays to the same destination IP address. This could include using a firewall/NAT subsystem or a source-based routing subsystem. This is because simple destination-based routing modules do not support sending traffic to the same destination over multiple routes. Using the firewall/NAT or source-based routing subsystems would overcome this limitation of traditional destination-based routing systems. Although this embodiment may not be as flexible as embodiments using encapsulation, it does not require use of the encapsulation server 106.

Figure 4:
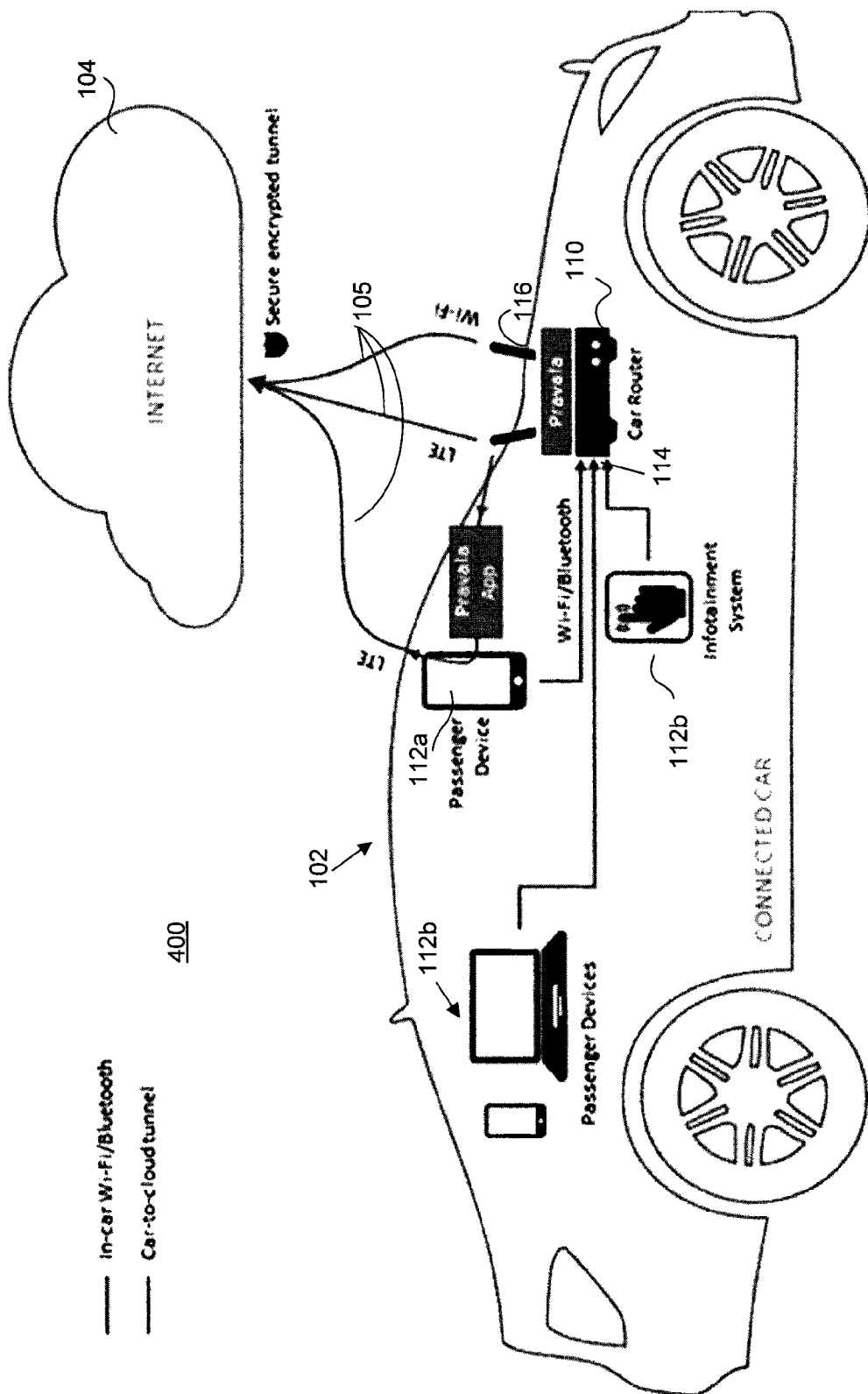
FIG. 4 is a schematic diagram of a connected vehicle as a micro-network.

Referring to FIG. 4, an example of a particular local network 102 is shown generally by numeral 400. In this embodiment the local network 102 is a connected vehicle. Examples of the client devices 112b in this embodiment include laptop or notebook computers, the vehicle's infotainment system, a vehicle diagnostics module, smart phones, tablets and the like. Examples of the proxy devices 112a in this embodiment include smart phones and Internet connected tablets, Internet connected laptop or notebook computers and the like. In addition to cellular and Wi-Fi connections, the communication network interface 116 may also include satellite and Dedicated short-range communications (DSRC). As will be appreciated, implementing the local network 102 in a connected vehicle allows for separation of critical vehicle sensors and diagnostic data communication from personal consumer data and in-vehicle telematics. That is, the local server 110 can be configured to act as a firewall between the critical vehicle sensors and diagnostic data communication on one side and the personal consumer data, in-vehicle telematics and communication network 104 on the other side. Further, the local network 102 allows for management of the critical vehicle sensors, diagnostic data communication, personal consumer data and in-vehicle telematics based on predefined policies.

In the embodiments described above, the computing device 112 may act as both a proxy device 112a and a client device 112b. That is, the computing device 112 may act as the client device 112b and forward its own data traffic to the local server 110. At the same time, the computing device 112 may act as the proxy device 112a and transmit data traffic received from the local server 110 to the communication network 104. The data traffic transmitted by the computing device 112 when acting as the proxy device 112a may or may not include the data traffic transmitted by the computing device 112 when acting as the client device 112b, depending on the how the local server 110 has scheduled the data traffic.

In the embodiments described above, a single local server 110 is provided for each local network 102. In an alternative embodiment, multiple local servers 110 may be provided for each local network 102. In this embodiment, each of the local servers 110 is configured to communicate with a subset of the computing devices 112. The subsets of computing devices 112 with which the local servers 110 can communicate may be mutually exclusive, depending on the implementation. The local servers 110 can also communicate with each other, facilitating access to all of the computing devices 112.

In yet an alternative embodiment, the local server 110 can connect to a remote local server at a remote local network. This scenario occurs when one local server 110, equipped with a communication interface 116 which is able to access wireless local area networks, is within the range of the local network 102 of a second local server 110, and chooses to join this network. As an example, a local server 110 equipped with a Wi-Fi interface could join the local network 102 of a second local server 110 which is broadcasting a Wi-Fi SSID. Consider two vehicles that are in close proximity to each other. Each vehicle has an independent local server 110 managing its local network 102. The local server 110 of the first vehicle connects to the local network 102 of the second vehicle to increase the number of communication links 105 available. It follows that the local server 110 of the second vehicle would also be able to join the local network 102 of the first vehicle, thereby increasing the number of links 105 available to the local server 110 of the second vehicle as well. In this embodiment, the total number of computing devices 112 available to the local servers 110 increases as they have access to remote computing devices via the remote local server.

Using the foregoing specification, the disclosure may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the disclosure. As such, functionality may be imparted on a physical device as a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the disclosure may involve one or more processing systems including, for example, computer processing unit (CPU) or processor, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

Using the description provided herein, those skilled in the art will be readily able to combine software created as described with appropriate general purpose or special purpose computer hardware to create a computer system and/or computer subcomponents embodying the disclosure, and to create a computer system and/or computer subcomponents for carrying out the method of the disclosure.

Although preferred embodiments of the disclosure have been described herein, it will be understood by those skilled in the art that variations may be made thereto without departing from the scope of the appended claims.

What is claimed is:

1. A local server configured to communicate with a plurality of computing devices, the local server comprising:
   memory for storing instructions;
   a processor configured to execute the instructions to:
      dynamically establish a direct connection with each of the plurality of computing devices to establish a local area network between the plurality of computing devices and the server in order to facilitate communication from each of the computing devices to a destination server across a communication network;
      identify at least one of the plurality of computing devices as a data relay;
      receive, from each of the plurality of computing devices, all data traffic to be transmitted across the communication network from the plurality of computing devices, the data traffic to be communicated to the destination server;
      transmit all the received data traffic to the at least one data relay for communication to the destination server via the communication network, wherein the communication network is a wide area network;
      receive response data from the data relay in response to the data traffic transmitted to the destination server; and
      transmit the response data to the one or more of the plurality of computing devices within the local area network.

2. The local server of claim 1 further comprising one or more communication interfaces to communicate directly with the communication network.

3. The local server of claim 2, wherein the communication interface comprises one or more wired or wireless interfaces including Ethernet interface, cable modem interface, DSL modem interface, a PSTN interface of a cellular interface, a Wi-Fi interface, a WiMax interface, a satellite interface, or a dedicated short-range communications interface.

4. The local server of claim 1, wherein the local server is configured to be installed within a vehicle.

5. The local server of claim 1, wherein the local area network is established using a local wired communication interface or a local wireless communication interface.

6. The local server of claim 5 wherein the local wired communication interface includes a connection interface for communication via one or more of Ethernet, USB, Lightning, CAN bus, Profibus, or Modbus.

7. The local server of claim 5 wherein the local wireless communication interface includes a connection interface for communication via one or more of Wi-Fi, Bluetooth, infrared, or near field communication.

8. The local server of claim 1 further configured to: encapsulate the data traffic and instruct the data relays to communicate the encapsulated data traffic to an encapsulation server, wherein the encapsulation server communicates the data traffic to the destination server.

9. The local server of claim 8 further configured to encrypt the encapsulated data traffic.

10. The local server of claim 2 further configured to transmit the data traffic using a plurality of the data relays, communication interfaces, or both the plurality of data relays and communication interfaces, thereby increasing bandwidth available for the data traffic.

11. The local server of claim 2 further configured to duplicate the data traffic across a plurality of the data relays, communication interfaces, or both the plurality of data relays and communication interfaces, thereby increasing reliability for the data traffic.

12. The local server of claim 2 further configured to communicate with another local server, thereby increasing the number of available data relays and communication interfaces.

13. The local server of claim 1 further configured to select one or more of the data relays based on a number of different operational transmission parameters.

14. The local server of claim 13, wherein the operational transmission parameters include a link type, battery level, cost, and signal strength.

15. The local server of claim 13, further configured to use the operational transmission parameters to select one or more of the data relays to satisfy one or more optimization parameters.

16. The local server of claim 15, wherein the optimization parameters include cost, quality, reliability, and performance.

17. The local server of claim 2, wherein the data traffic is dropped if no suitable data relays or communication interfaces are available.

18. The local server of claim 13, wherein one or more of the data relays is selected based upon the destination server.

19. The local server of claim 4, wherein the local server is further configured to separate critical vehicle sensors and diagnostic data communication from personal consumer data and in-vehicle telematics.

20. The local server of claim 15, wherein the local server is further configured to retrieve the optimization parameters from devices remote from the local server.

21. The local server of claim 20, wherein the retrieved optimization parameters are authenticated using a predefined authentication algorithm.

22. The local server of claim 1 further configured to transmit the data traffic to the data relays in accordance with a predefined policy.

23. A non-transitory computer readable medium having stored thereon instructions which, when executed by a computing device cause the computing device to:
dynamically establish a connection with a local server to join a local area network;
dynamically identify the computing device as a data relay for the local server;
transmit data traffic to the local server, the data traffic to be communicated to a destination server across a communication network;
receive outbound data traffic from the local server on behalf of a plurality of computing devices that are part of the local area network;
transmit the outbound data traffic to one or more destination servers across the communication network;
receive inbound data traffic from the one or more destination servers over the communication network on behalf of the plurality of computing devices;
transmit the inbound data traffic to the local server over the local area network; and
receiving response data traffic from the local server in response to the data traffic transmitted to the local server.

24. The computer readable medium of claim 23, wherein the computing device acts as a proxy on behalf of the local server.

25. A local area network comprising:
a local server; and
a plurality of computing devices configured to communicate directly with the local server over a local area network, wherein at least one of the plurality of computing devices is dynamically identified as a data relay;
wherein the local server is configured to:
receive, from each of the plurality of computing devices, ail data traffic from to be transmitted across a communication network from the plurality of computing devices, the data traffic to be communicated to one or more destination servers;
communicate all the received data traffic to the at least one data relay;
receive response data from the at least one data relay in response to the data traffic transmitted to the destination server; and
communicate the response traffic to a corresponding one or more of the plurality of computing devices; and
wherein the at least one data relay is configured to:
receive the data traffic from local server;
communicate the data traffic to the destination server via the communication network, wherein the communication network is a wide area network;
receive the response data from the destination server via the communication network; and
communicate the response data to the local server.

26. The network of claim 25, wherein the network is implemented within a vehicle.

\* \* \* \* \*